US008266096B2

(12) United States Patent
Navarrete et al.

(10) Patent No.: US 8,266,096 B2
(45) Date of Patent: Sep. 11, 2012

(54) VENDOR PORTFOLIO MANAGEMENT IN SUPPORT OF VENDOR RELATIONSHIP MANAGEMENT ANALYSIS, PLANNING AND EVALUATION

(75) Inventors: Jorge A. Navarrete, Menlo Park, CA (US); Stephen J. O'Connor, Dublin, CA (US); Peter P. Dai, Fremont, CA (US); Johri Dhanotra, Los Altos, CA (US); Hubert Yau Kin Siu, San Mateo, CA (US); Charudutt Nagori, Sunnyvale, CA (US); Ashish Kalani, Sunnyvale, CA (US)

(73) Assignee: BMC Software, Inc., Houston, TX (US)

( * ) Notice: Subject to any disclaimer, the term of this patent is extended or adjusted under 35 U.S.C. 154(b) by 220 days.

(21) Appl. No.: 12/604,611

(22) Filed: Oct. 23, 2009

(65) Prior Publication Data
US 2010/0106680 A1    Apr. 29, 2010

Related U.S. Application Data

(60) Provisional application No. 61/108,424, filed on Oct. 24, 2008.

(51) Int. Cl.
*G06F 7/00* (2006.01)

(52) U.S. Cl. ........................................ 707/600; 707/601

(58) Field of Classification Search .................. 707/600, 707/601; 705/1
See application file for complete search history.

(56) References Cited

U.S. PATENT DOCUMENTS

2006/0161884 A1* 7/2006 Lubrecht et al. ............... 717/104
2008/0133259 A1* 6/2008 O'Connor et al. ................ 705/1

OTHER PUBLICATIONS

"Portfolio, Resource, and Project management Exploring the benefits of a solution built on complementary SAP Applications", Apr. 15, 2008 SAP Solution in Detail SAP Product Lifecycle management.*

* cited by examiner

Primary Examiner — Etienne Leroux
Assistant Examiner — Cindy Nguyen

(57) ABSTRACT

Various examples include a system and methods in support of vendor relationship management, analysis, planning and evaluation including dealing with collections of vendors called vendor portfolios. In various examples the system includes a database, vendor portfolio definer, a vendor portfolio populator, and a vendor portfolio analyzer. The database houses vendor data. In various examples the vendor portfolio definer allows vendor portfolios to be created, meta data, including complex documents, to be associated with vendor portfolios, and user access permissions to be assigned to vendor portfolios. In various examples the vendor portfolio populator facilitates user selection of the vendors that will make up the collection of vendors in the vendor portfolio. The vendor portfolio analyzer analyzes a business metric using vendor portfolios. In various examples the vendor portfolio analyzer allows user to perform what-if analysis on vendor portfolios. In various examples the vendor portfolio definer includes a risk management definer, the vendor portfolio populator includes a risk management screener, and the vendor portfolio analyzer includes a risk manager to facilitate managing vendors base on the organizational risk they pose. In various examples the database contains information about obligations owed to and from a vendor and the vendor portfolio analyzer includes an obligation analyzer to analyze the organizational impact of vendor obligations.

24 Claims, 16 Drawing Sheets

Vender Portfolios

New

Search By: ☐ Name ☐ Owner [          ] Search

| Name | Dynamic Portfolio | Published | Description | Last Updated By | Owner | Last Updated Date Time | Actions | |
|---|---|---|---|---|---|---|---|---|
| All Critical Vendors | | | All vendors critical to bus... | Plank, Jason | Plank, Jason | 12/20/07 7:06 PM | Edit | Delete |
| All Desktop Vendors | ✓ | ✓ | All vendors providing de... | Abbott, Mike | Abbott, Mike | 10/4/07 2:53 PM | Edit | Delete |
| All Software Vendors | ✓ | ✓ | Covers all types of soft... | Abbott, Mike | Abbott, Mike | 10/4/07 2:53 PM | Edit | Delete |
| All Vendors | ✓ | | | Plank, Jason | Plank, Jason | 10/12/07 3:48 PM | Edit | Delete |
| All Vendors with Direct Access Risk | ✓ | ✓ | | Plank, Jason | Plank, Jason | 11/2/07 1:37 PM | Edit | Delete |
| Consulting Vendors | ✓ | ✓ | All vendors providing co... | Plank, Jason | Plank, Jason | 11/20/07 11:47 AM | Edit | Delete |
| My Critical Vendors | ✓ | | Critical vendors own... | Plank, Jason | Plank, Jason | 10/12/07 3:25 PM | Edit | Delete |

FIG. 2A

VENDOR PORTFOLIO DETAILS: ALL SOFTWARE VENDORS

| New | Edit | Delete | Make Static | Make Private |

Name: All Software Vendors
Published: ✓
Dynamic Portfolio: ✓
Description: This covers all types of software vendors
Last Updated By: Abbott, Mike

| Vendors | Statistics | Obligations | Attachments | Links |

Search By: ☐ Name ☐ Status ☐ Type ☐ Criticality ☐ Risk   [Search]

| Name | Status | Sample Flex Code | Types | Criticality | Risk |
|---|---|---|---|---|---|
| Arena 55 Software | Active | Value D | Software-Infrastructure | Critical to Operations | Direct Access |
| BEA | Active | Value D | Software-Infrastructure | Critical to Operations | Direct Access |

FIG. 2B

Vendor Process Details: Machiavelli Get Well

[Create] [Delete]

Vendor Processes

ID: vp_186
Name: Machiavelli Get Well
Description: Performance Improvement project for Machiavelli related to their Oracle product
State: Completed
Status: Wrap Up
Benefitting Organizational Units: Sales Group
Owners: Plank, Jason Schedule Health: On Schedule
RFP Number:
Last Updated By: Plank, Jason
Vendors: Machiavelli Database Systems Lifecycle | Attachments | Links Vendor Process Request

| Issue Identification | Evaluation Planning | Performance Improvement Evaluation | Wrap Up |
|---|---|---|---|
| Done | Done | Done | Done |
| ☑ Performance Issue | ☑ Notify Internal Constituents | ☑ Conduct Performance Reviews | ☑ Notify Internal Constituents |
| ☑ Determine Vendor Criticality | ☑ Notify Vendor | ☑ Conduct Vendor Meeting Review | ☑ Notify Vendor |
| ● Approve Go/No Go | ☑ Develop Schedule | ☑ Evaluate Vendor Performance | ☑ Implement Resolution |
| | ☑ Finalize Improvement Criteria | ☑ Present Findings to Vendor Review Board | |
| | ☑ Vendor Recommendation Plan | ● Approve Evaluation Recomendations | |
| | ● Approve Improvement Plan | | |

Vendor Over-Spend Analysis

| Portfolio: | My Critical Vendors |
|---|---|
| Time Period: | Q1FY2006 to Q4FY2008 |
| Cost Type: | Expense and Depreciation |
| Cost | Assets, Vendor Services, Contractors |

| Vendor | Budgeted Cost | Actual Cost | Variance |
|---|---|---|---|
| Siebel | $5,593,000.00 | $7,494,000.00 | ($1,901,000.00) |
| *InfoDynamics | $919,999.96 | $149,944.00 | $770,055.96 |
| FYG Leaf Consulting | $368,000.00 | $674,820.00 | ($306,820.00) |
| BMC | $208,111.20 | $102,027.80 | $106,083.40 |
| Constant Networks | $50,000.00 | $4,323.00 | $45,677.00 |
| Arena 55 Software | $9,000.00 | $10,700.00 | ($1,700.00) |
| *Machiavelli Database Systems | $0.00 | $60,403.00 | ($60,403.00) |
| Slick Systems | $0.00 | $0.00 | $0.00 |

Budgeted Vendor Spend Analysis

| Portfolio: | All Software Vendors |
|---|---|
| Time Period: | Q1FY2006 to Q4FY2008 |
| Cost Type: | Expense and Depreciation |
| Cost | Assets, Vendor Services, Contractors |

| Vendor | Budgeted Cost | Actual Cost | Variance |
|---|---|---|---|
| Oracle | $15,148,060.06 | $23,322,55.63 | ($8,174,490.57) |
| Clarify | $14,169,936.60 | $10,901,061.80 | $3,268,874.80 |
| IBM | $7,769,869.46 | $5,547,488.29 | $2,222,381.17 |
| Siebel | $4,505,500.00 | $4,994,000.00 | ($488,500.00) |
| Peoplesoft/Oracle | $2,411,583.90 | $1,318,148.40 | $1,093,435.50 |
| BMC | $156,083.40 | $102,027.80 | $54,055.60 |
| Microsoft | $98,546.86 | $144,273.32 | ($45,726.64) |
| Arena 55 Software | $9,000.00 | $10,700.00 | ($1,700.00) |
| *Machiavelli Database Systems | $0.00 | $60,403.00 | ($60,403.00) |
| ITM Software | $0.00 | $0.00 | $0.00 |

FIG. 2E

New Vendor Portfolio

| Save and Done | Save and New | Cancel |

Name*: [    ]

Published ☐

Dynamic Portfolio ☑ — 310

Description: [    ]

} 308

Basic Filtering Options

Name: [    ]    Status: [    ] [Select]

Parent Vendor: [    ] [Select]    Types: [    ] [Select]

Parent Vendor: [    ] [Select]    Risk: [    ] [Select]

Parent Vendor: [    ] [Select]    Criticality: [    ] [Select]

} 309

| Save and Done | Save and New | Cancel |

FIG. 3A

New Access Group

[Save] [Cancel]

Name*

Members [Edit...]

Organizational Unit* Computer Manufacturing, Inc. [Edit...]

Permissions

| Element | View | Edit | Delete | Prioritize | Analyze | |
|---|---|---|---|---|---|---|
| Finance Actuals | ☐ | ☐ | ☐ | | | [Reset] |
| IT Department Budget | ☐ | ☐ | ☐ | | | [Reset] |
| Project | ☐ | ☐ | ☐ | ☐ | ☐ | [Reset] |
| Project Financials | ☐ | ☐ | ☐ | | | [Reset] |
| Global Task Template | ☐ | ☐ | ☐ | | | [Reset] |
| Project Approval Override | ☐ | | | | | |

- 'View' permission is needed for all other permissions
- 'Edit' permission is needed for 'Delete' and 'Prioritize' permissions

[Save] [Cancel]

FIG. 5A

| Vendor Portfolio Obligations | | | |
|---|---|---|---|
| Portfolio: All Vendors | | | |
| Status: Current, Future, Late, Completed, Cancelled | | | |
| Date Range: 7/21/08 – 1/17/09 (90 days before/after 10/19/08 | | | |
| Name | Owner | Type | Due Date |
| Server Support Renewal | Bagby, Beverlyn | Hardware Maintenance Renewal | 8/2/08 |
| Make go/no go decision prior to autorenewal | Plank, Jason | Software License Renewal | 8/29/08 |
| Softphone License renewal | Plank, Jason | Software License Renewal | 9/20/08 |
| DataMart Milestone 1 – Detailed Scoping Document | Abbott, Mike | Service | 10/20/08 |

FIG. 8A

VENDOR PORTFOLIO MANAGEMENT IN SUPPORT OF VENDOR RELATIONSHIP MANAGEMENT ANALYSIS, PLANNING AND EVALUATION

CLAIM OF PRIORITY

This patent application claims the benefit of priority, under 35 U.S.C. Section 119(e), U.S. Provisional Patent Application Ser. No. 61/108,424, entitled "VENDOR PORTFOLIO MANAGEMENT IN SUPPORT OF VENDOR RELATIONSHIP MANAGEMENT ANALYSIS, PLANNING AND EVALUATION," filed on Oct. 24, 2008; the disclosure of which is incorporated by reference herein and below in its entirety.

TECHNICAL FIELD

This document pertains generally to information technology (IT) management, and more particularly, but not by way of limitation, to a system and methods for managing vendor portfolios to support vendor relationship management analysis, planning, and evaluation.

BACKGROUND

The IT management space is complex and more than 50% of every dollar spent by IT goes to vendors. IT typically manages, evaluates, and tracks vendors individually. Although some products allow customers to search and retrieve a set of vendors, the vendors are still treated individually because the set was nothing more than a list of individual vendors. Treating vendors individually impairs IT's ability to analyze vendor data and to be efficient—impairing IT's ability to manage this significant portion of its budget. Therefore, working on collections of vendors will improve IT's ability to analyze vendor data as well as increase IT's efficiency to better manage vendors.

OVERVIEW

Vendors can be collected into vendor portfolios. The portfolios can have the following characteristics: be given user access criteria so that they may be shared; have meta data applied to them including portfolio-based attachments such as reports, presentations, and other documents; and allow business metrics to be analyzed across the vendors within the portfolio. Vendor portfolios can improve IT's ability to analyze vendor data as well as increase IT's efficiency to better manage vendors. This document provides numerous examples in the detailed description, an overview of which is included below.

Example 1 describes a computer-implemented method. In this example, the method comprises storing information technology (IT) vendor information from an organization's IT vendors in a database; defining a plurality of vendor portfolios and storing the plurality of vendor portfolios in the database; populating a first vendor portfolio with a first subset of the organization's IT vendors and associated IT vendor information; populating a second vendor portfolio with a second subset of the organization's IT vendors and associated IT vendor information; and managing the organization's IT vendors, using one or more processors, by analyzing at least one business metric using the vendor portfolio.

In Example 2, the method of Example 1 optionally is performed such that populating the first vendor portfolio includes selecting the first subset of the organization's IT vendors manually or by querying the IT vendor information.

In Example 3, the method of one or any combination of Examples 1-2 optionally is performed such that managing the organization's IT vendors includes performing what-if analysis.

In Example 4, the method of one or any combination of Examples 1-3 optionally is performed such that changing the third vendor portfolio includes modifying, adding, or deleting at least one piece of data related to the third vendor portfolio, the one piece of data including the third vendor portfolio's definition, meta data associated with the third vendor portfolio, or the IT vendor information within the third vendor portfolio.

In Example 5, the method of one or any combination of Examples 1-4 optionally is performed such that defining a plurality of vendor portfolios includes managing access to the plurality of vendor portfolios by assigning a user permission criterion to at least one of the plurality of vendor portfolios.

In Example 6, the method of one or any combination of Examples 1-5 is optionally performed such that defining a plurality of vendor portfolios includes associating meta data to at least one of the plurality of vendor portfolios, the meta data including a report, a presentation, or a document.

Example 7 describes a computer-implemented method. In this example, the method comprises storing information technology (IT) vendor information from an organization's IT vendors in a database; defining at least one organizational risk level; defining a vendor portfolio based on the organizational risk level; storing the vendor portfolio in the database; placing a plurality of the organization's IT vendors that match the organizational risk level and associated IT vendor information into the vendor portfolio; and managing the organization's IT vendors, using one or more processors, by analyzing at least one business metric using the vendor portfolio.

In Example 8, the method of Example 7 optionally is performed such that placing the plurality of the organization's IT vendors that match the organizational risk level and associated IT vendor information in the vendor portfolio includes selecting the plurality of the organization's IT vendors manually or by querying the IT vendor information.

In Example 9, the method of one or any combination of Examples 7-8 optionally is performed such that managing the organization's IT vendors includes performing what-if analysis. The what-if analysis includes: copying the vendor portfolio to a second vendor portfolio; changing the second vendor portfolio; and analyzing at least one business metric using the second vendor portfolio.

In Example 10, the method of one or any combination of Examples 7-9 optionally is performed such that changing the second vendor portfolio includes modifying, adding, or deleting at least one piece of data related to the second vendor portfolio, the one piece of data including the second vendor portfolio's definition, meta data associated with the second vendor portfolio, or the IT vendor information within the second vendor portfolio.

In Example 11, the method of one or any combination of Examples 7-10 optionally is performed such that managing the organization's IT vendors includes managing access to the vendor portfolio by assigning a user permission criterion to the vendor portfolio.

In Example 12, the method of one or any combination of Examples 7-11 is optionally performed such that defining a vendor portfolio includes associating meta data with the vendor portfolio, the meta data including a report, a presentation, or a document.

Example 13 describes a computer-implemented method. In this example, the method comprises storing information technology (IT) vendor obligations between an organization's IT department and an organization's vendors in a database; defining a vendor portfolio and storing the vendor portfolio in the database; placing IT vendor obligations, associated with a plurality of the organization's IT vendors, into the vendor portfolio; and managing the plurality of the organization's IT vendors, using one or more processors, by analyzing the organizational impact of the IT vendor obligations within the vendor portfolio.

In Example 14, the method of Example 13 optionally is performed such that the plurality of the organization's IT vendors are selected manually or by querying IT vendor information.

In Example 15, the method of one or any combination of Examples 13-14 optionally is performed such that managing the organization's IT vendors includes performing what-if analysis.

In Example 16, the method of one or any combination of Examples 13-15 optionally is performed such that changing the contents of the second vendor portfolio includes modifying, adding, or deleting at least one piece of data related to the second vendor portfolio, the one piece of data including the second vendor portfolio's definition, meta data associated with the second vendor portfolio, or the IT vendor obligations within the second vendor portfolio.

In Example 17, the method of one or any combination of Examples 13-16 optionally is performed such that managing the organization's IT vendors includes managing access to the vendor portfolio by assigning a user permission criterion to the vendor portfolio.

In Example 18, the method of one or any combination of Examples 13-17 is optionally performed such that defining a vendor portfolio includes associating meta data with the vendor portfolio, the meta data including a report, a presentation, or a document.

Example 19 describes a system for supporting information technology (IT) vendor management. The system comprises at least one processor operable to execute: a database containing IT vendor information; a vendor portfolio definer, coupled to the database, and configured to create a vendor portfolio and store the vendor portfolio to the database; a vendor portfolio populator, coupled to the database, and configured to place a plurality of an organization's IT vendors and associated IT vendor information, into the vendor portfolio; and a vendor portfolio analyzer, coupled to the database, and configured to analyze at least one business metric using the vendor portfolio.

In Example 20, the system of Example 19 is optionally configured such that the vendor portfolio definer includes a risk management definer configured to define an organizational risk level and associating the vendor portfolio to the organizational risk level; and the vendor portfolio populator includes a risk management screener configured to enable only an organization's IT vendors that match the organizational risk level into the vendor portfolio.

In Example 21, the system of one or any combination of Examples 19-21 is optionally configured such that the application server includes a risk management analyzer configured to analyze a second business metric, associated with the organizational risk level, using the vendor portfolio.

In Example 22 the system of one or any combination of Examples 19-21 is optionally configured such that the risk management analyzer includes a what-if analyzer configured to: copy the vendor portfolio to a second vendor portfolio; change the second vendor portfolio; and analyze the first or second business metric using the second vendor portfolio.

In Example 23 the system of one or any combination of Examples 19-22 is optionally configured such that the application server includes an obligation analyzer configured to analyze organizational impact of IT vendor obligations within the vendor portfolio, the IT vendor obligations being obligations between an organization's IT department and the organization's IT vendors.

In Example 24 the system of one or any combination of Examples 19-23 is optionally configured such that the obligation analyzer includes a what-if analyzer configured to: copy the vendor portfolio to a second vendor portfolio; change the second vendor portfolio; and analyze the organizational impact of the IT the vendor obligations within the second vendor portfolio.

In Example 25 the system of one or any combination of Examples 19-24 is optionally configured such that the vendor portfolio analyzer includes a what-if analyzer configured to: copy the vendor portfolio to a second vendor portfolio; change the second vendor portfolio; and analyze at least one business metric using the vendor portfolio.

In Example 26 the system of one or any combination of Examples 19-25 is optionally configured such that the vendor portfolio definer includes an access controller configured to define user access criteria and assigning the user access criteria to the vendor portfolio.

In Example 27 the system of one or any combination of Examples 19-26 is optionally configured such that the vendor portfolio definer includes a meta data editor configured to associate meta data with the vendor portfolio.

Example 28 describes a computer-implemented method. In this example, the method comprises (i) creating a vendor portfolio, the vendor portfolio comprising: a subset of the organization's IT vendors and associated IT vendor information; meta data; and a user permission criterion; and (ii) managing the organization's IT vendors, using one or more processors, by analyzing at least one business metric across the vendor portfolio.

In Example 29, the method of one or any combination of Examples 1-5 optionally is performed such that managing the organization's IT vendors includes applying a business process to each IT vendor in the first vendor portfolio, the business process being associated with the findings of analyzing the business metric across the first vendor portfolio.

This overview is intended to provide an overview of the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2A illustrates an example user interface for managing vendor portfolios.

FIG. 2B illustrates an example user interface of a vendor portfolio showing the contents of the vendor portfolio.

FIG. 2D illustrates an example user interface of applying a business process to vendors within a vendor portfolio.

FIG. 2E illustrates an example user interface of vendor portfolio analysis showing multiple portfolios.

FIG. 3A illustrates an example user interface for creating and populating a vendor portfolio showing the search criteria for a dynamic portfolio.

FIG. 5A illustrates an example user interface for entering and editing user access restrictions.

FIG. 8A illustrates an example user interface for managing vendor obligations.

DETAILED DESCRIPTION

Figure 1:
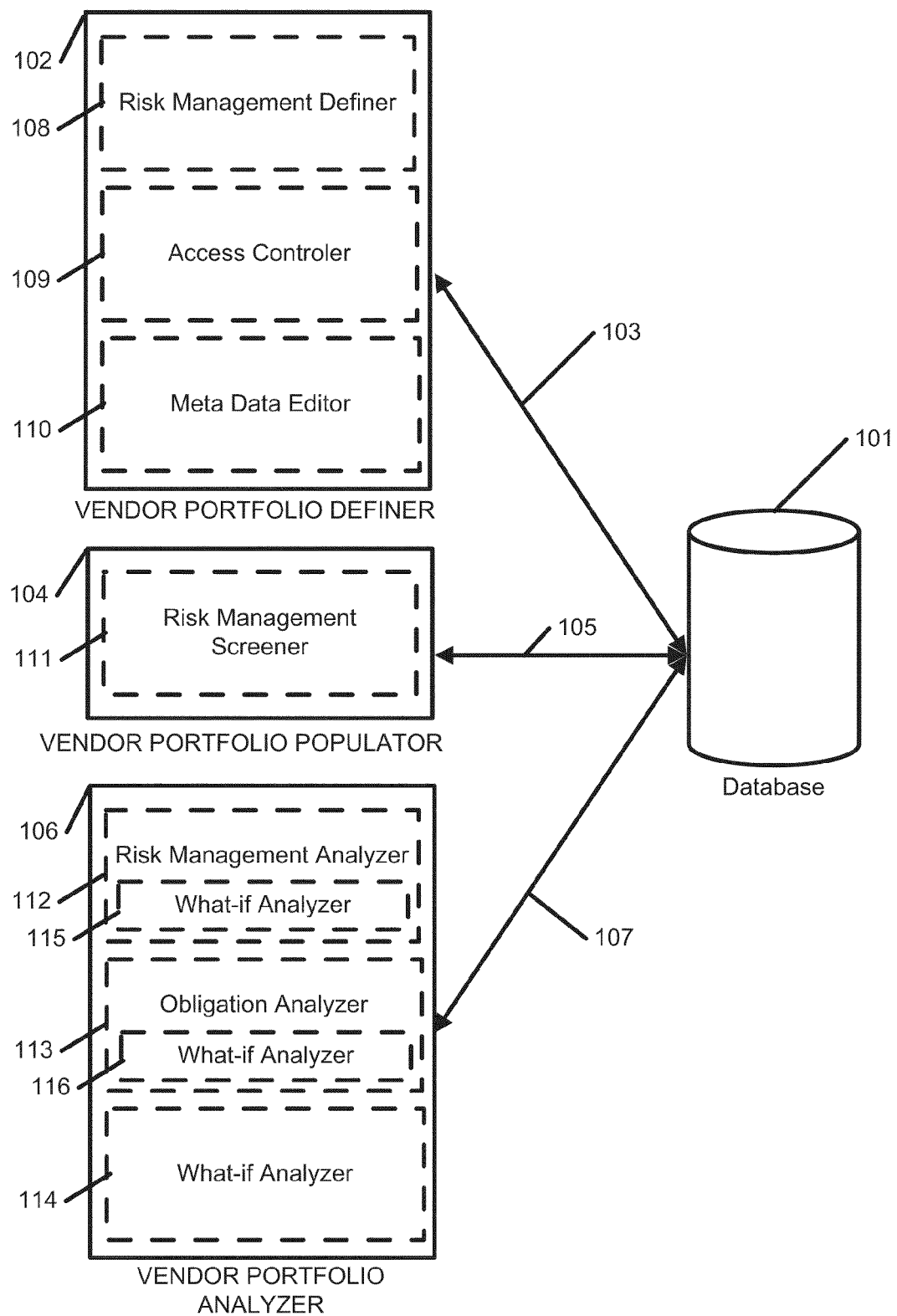
FIG. 1 illustrates an example of an IT vendor management support system including a vendor portfolio definer, a vendor portfolio populator, and a vendor portfolio analyzer.

IT vendor management is a particularly complex space. Nearly everything done by an IT person either interacts directly with a vendor or uses tools from a vendor. More than half of IT's spending goes to vendors, including things like software maintenance, contractor payments, and other negotiated fees. Often, lines of business, within an organization, fund the hardware, software, and personnel to solve a particular business problem. IT focuses on helping the line of business they are currently working with by picking the best product or solution for that one business problem. This may lead to a silo-ing effect where IT fails to consider factors outside of the particular business problem, such as, for example, whether a comparable product has already been purchased, perhaps as part of a suite. Many times different parts of IT may be working past each other, such as purchasing software that the organization has already purchased, continuing to pay automatically renewing licenses for products that are no longer in use, or failing to understand the organizational criticality of vendors. Lack of IT vendor visibility across the organization can also lead to loss of lifecycle data on a vendor, such as: pre-purchasing demonstrations; data surrounding the decision to use, or not use, the vendor; and procedures to terminate the vendor relationship.

One approach may use a spreadsheet to track vendor management information. This tends to be a poor approach because it tends to be managed by a few people with narrow interests and the data is not generally visible across the organization. Additionally, often only high visibility vendors are tracked in such a way and so smaller vendors may be ignored altogether.

Another approach is to use a "home-grown" database application, such as a Microsoft Access database. This approach is also poor because these home-grown applications are often constructed by special interests and suffer from the same myopia discussed with respect to spreadsheets that leads to vendors falling through the cracks. Even if the home-grown application allows for greater access to the vendor data than spreadsheets, users are still hampered because the database can only return a list of vendors and not an instantiated collection of vendors that an application can work on, leaving it up to the user to work around this limitation.

These and other problems are addressed by the various methods and systems described herein.

Instantiating collections of vendors into vendor portfolios provides a convenient way to deal with a collection of vendors. Because a vendor portfolio is an entity and not merely a list of vendors, users can easily manage vendors, for example, by: analyzing business metrics across the vendors within a vendor portfolio; sharing the vendor portfolio; applying meta data to the vendor portfolio, including adding portfolio based attachments such as reports, PowerPoint Presentations, other analysis that may have been done in spreadsheets, or total targeted spend for this set of vendors.

Vendor portfolios solve the numerous problems described above by allowing users to bring together a variety of vendors so that the vendors may be analyzed together. Vendor portfolios also differ from the home-grown application searches described above because they increase the functionality and flexibility available to users working with a collection of vendors. Saved searches, on the other hand, are just lists.

Vendor portfolios also allow users to easily analyze organizational risks imposed by vendors in a convenient way while reducing the chance of overlooking important issues. For example, a "critical" vendor portfolio can be created containing vendors critical to the organization. The critical vendor portfolio can then be shared and consulted by users to ensure that decisions involving a critical vendor will appropriately weigh the consequences of such action given the organizational risks involved with a critical vendor.

Vendor portfolios can also be used to conveniently collect and manage IT obligations between an organization's IT department and vendors. These obligations could include information distilled from contracts, such as when bills are due, seat licensing reporting requirements, or termination procedures, as well as request for proposal ("RFP") requirements, or even simple agreements between IT and a vendor such as an agreement for a vendor to provide a demonstration of his product. By using a vendor portfolio, all of the various vendor obligations in the portfolio are immediately evident to a user, increasing that user's ability to timely manage the obligations, and thus the vendors.

FIG. 1 illustrates an example system for supporting vendor relationship management, analysis, planning, and evaluation. This system 100 includes a database 101, a vendor portfolio definer 102, a vendor portfolio populator 104, and a vendor portfolio analyzer 106. The vendor portfolio definer 102, vendor portfolio populator 104, and vendor portfolio analyzer 106 can be modules implemented in hardware, firmware, or software that executes on one or more processors. In various examples the vendor portfolio definer 102, vendor portfolio populator 104, and vendor portfolio analyzer 106 can be separate programs or one or more can be integrated together.

In various examples the database 101 is coupled to the vendor portfolio definer 102 by connection 103. The database 101 is coupled to the vendor portfolio populator 104 by connection 105. The database 101 is coupled to the vendor portfolio analyzer 106 by connection 107. Connection 103, connection 105, and connection 107 are not limited to any particular type of connection, and can include any type of connection or types of connections used to couple the database 101 to the vendor portfolio definer 102, vendor portfolio populator 104, and vendor portfolio analyzer 106. It will be understood that the database 101 may be any type of electronic data store capable of storing and retrieving information, including, but not limited to, relational database systems or object database systems.

In various examples the vendor portfolio definer 102 allows a user to define and store vendor portfolios to the database 101. The vendor portfolio definer 102 has an interface by which various vendor portfolio creation options can be selected; an example interface is shown at 308 in FIG. 3A.

In various examples the vendor portfolio definer 102 includes an access controller 109. The access controller 109 permits one or more user access criteria to be assigned to a vendor portfolio. In various examples the access controller 109 has an interface by which the user access criteria can be set; an example is shown at FIG. 5A.

In various examples the vendor portfolio definer 102 includes a meta data editor 110. The meta data editor 110 allows meta data to be associated with the vendor portfolio, including, but not limited to, vendor portfolio based attachments, such as reports, presentations, or other documents, and categorization information.

In various examples the vendor portfolio populator 104 allows a user to select the vendors to be included in a vendor portfolio. The vendor portfolio populator 104 has an interface by which vendors can be selected. In various examples vendors are selected by the user. In various examples vendors are selected by matching a search criteria; an example interface is shown at 309 in FIG. 3A.

In various examples the vendor portfolio analyzer 106 allows a user to manage multiple vendor portfolios, the vendors within a single portfolio, and conduct analysis on vendor portfolios. In various examples the vendor portfolio analyzer 106 has an interface by which multiple portfolios can be managed; an example is shown at FIG. 2A. In various examples the vendor portfolio analyzer 106 has an interface by which vendors within a vendor portfolio can be managed; an example is shown at FIG. 2B. In various examples the vendor portfolio analyzer 106 has an interface in which vendor portfolios can be analyzed; examples are shown at FIG. 2C and FIG. 2E. In various examples the vendor portfolio analyzer 106 has an interface in which business processes applied to vendors can be managed; an example is shown at FIG. 2D

In various examples the vendor portfolio analyzer 106 includes a what-if analyzer 114. The what-if analyzer 114 allows a user to run decision making scenarios.

In various examples, to facilitate vendor risk analysis, the vendor portfolio definer 102 includes a risk management definer 108, the vendor portfolio populator 104 includes a risk management screener 111, and the vendor portfolio analyzer 106 includes a risk management analyzer 112. In various examples the risk management definer 108 allows a user to define organizational risk levels and create a vendor portfolio based on one of those risk levels. In various examples the risk management screener 111 acts to restrict the vendors included in a vendor portfolio to vendors that match the organizational risk level the vendor portfolio is based on. In various embodiments the risk management analyzer 112 analyzes business metrics, including metrics associated with an organizational risk level, across the vendors in the vendor portfolio based on the organizational risk level.

In various examples the risk management analyzer 112 includes a what-if analyzer 115. The what-if analyzer 115 allows a user to run decision making scenarios dealing with organizational risk levels.

In various examples, to facilitate the tracking of vendor obligations, the vendor portfolio analyzer 106 includes an obligation analyzer 113. The obligation analyzer 113 allows a user to track the obligations owed from a vendor to the organization and from the organization to the vendor. In various examples the obligation analyzer 113 has an interface displaying the vendors in a portfolio, the type of obligation, and the date the obligation is owed, an example of which is shown at FIG. 8A.

In various examples the obligation analyzer 113 includes a what-if analyzer 116. The what-if analyzer 116 allows a user to run decision making scenarios dealing with vendor obligations.

Figure 2:
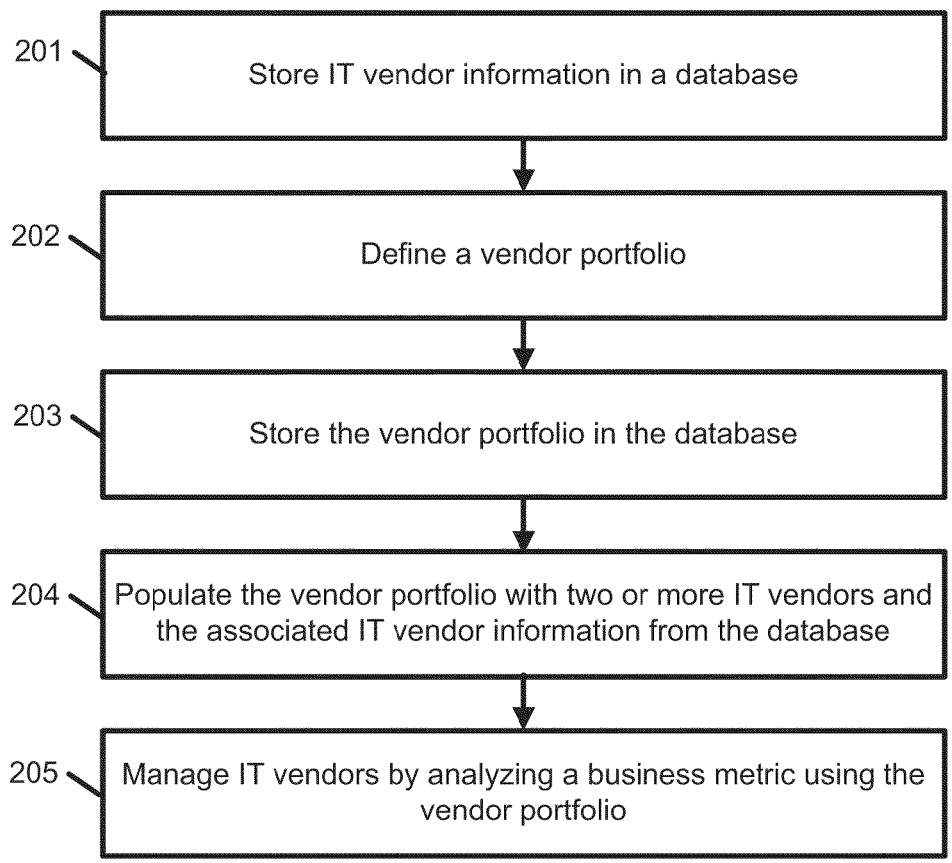
FIG. 2 is a flowchart illustrating an example IT vendor management support method using vendor portfolios.
Figure 2C:
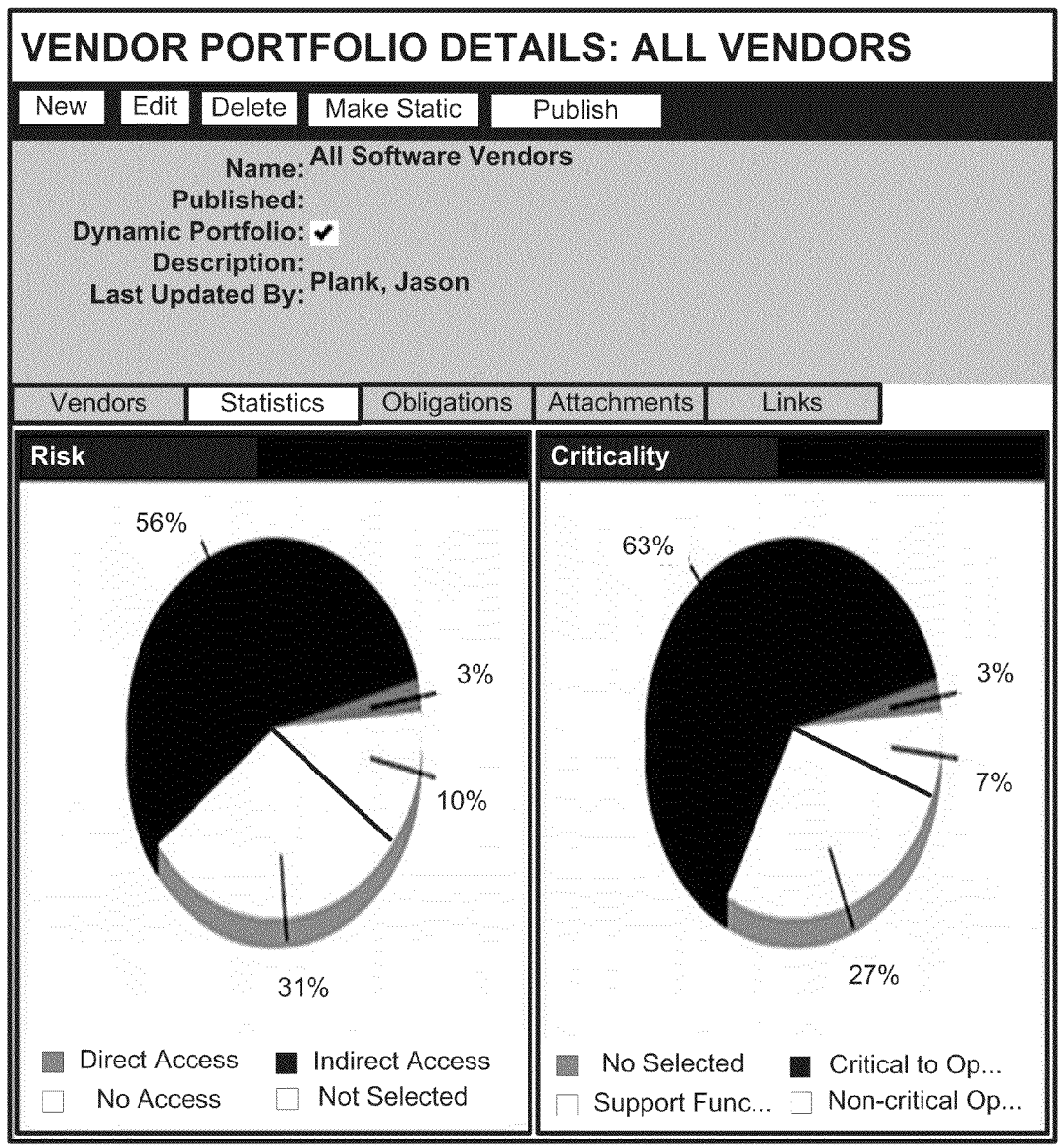
FIG. 2C illustrates an example user interface of a vendor portfolio showing portfolio-based analysis.

FIG. 2 is a flowchart illustrating an example method to support vendor relationship management, analysis, planning, and evaluation.

At 201 vendor information is stored in a database, such as the database 101 shown in FIG. 1.

At 202 the user defines a vendor portfolio. 308 in FIG. 3A is an example interface to define a vendor portfolio. In various examples the definition of a vendor portfolio includes naming the vendor portfolio, associating meta data to the vendor portfolio, and assigning user access criterion to the vendor portfolio—which is useful for sharing or publishing a vendor portfolio. In various examples the vendor portfolio may be defined at its creation and redefined, or changed, at some later time. FIG. 2A shows an example interface of a number of defined vendor portfolios.

At 203 the vendor portfolio is stored in a database, such as the database 101 shown in FIG. 1. It will be understood that the vendor portfolio and the vendor information can be stored in the same database or different databases.

At 204 the user populates the vendor portfolio with two or more vendors. FIG. 2B shows an example interface showing multiple vendors in a vendor portfolio.

At 205 the user uses the vendor portfolios to manage vendors. In various examples the user analyzes business metrics across the vendors in a vendor portfolio. FIG. 2C shows an example interface showing analysis of business metrics in a vendor portfolio.

In various examples one or more business processes can be associated with the vendor portfolio based on the analysis and findings from the vendor portfolio. In various examples these business processes can be governance or management processes such as implementing greater risk management, on-boarding, get-well, terminating processes, or other vendor lifecycle processes. In various examples a first vendor portfolio contains vendors of a first nature and a second vendor portfolio contains vendors of a second nature, the first vendor portfolio, and subsequently the vendors therein, can have different risk management processes than the second vendor portfolio. In various examples monitoring these processes is business metric which is analyzed. FIG. 2D shows an example interface showing the application of a business process, a vendor initiative request, to a vendor at 206.

FIG. 2E shows an example interface showing analysis of business metrics, specifically spend analysis, in two vendor portfolios and comparing the results. Spend analysis assists in understanding the planned and actual spending of vendors by analyzing the asset related costs for physical assets, logical assets such as server or site licensing, and vendor services such as ongoing maintenance services, consulting services, consultants, and contractors. Using vendor portfolios provides perspective to spend analysis by allowing categorizations and comparisons of the spending, such as comparing hardware vendor versus software vendor spending.

Vendor portfolios permit users to collect vendors, and analyze business metrics within the context of the collection. Further, the ability to associate meta data to the portfolio, or publish the portfolio, permits the user to easily communicate amongst others in the organization. These things increase the convenience and capability of those managing vendors.

Figure 3:
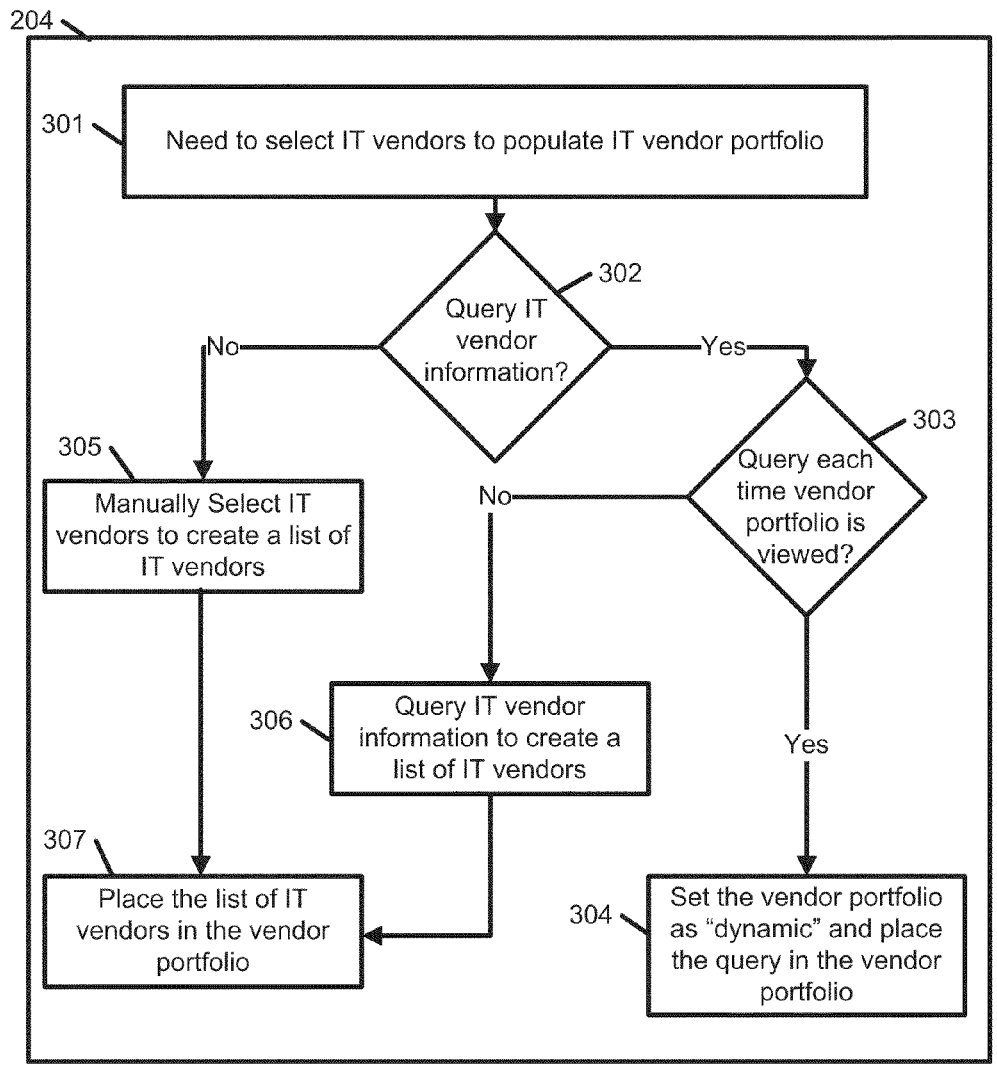
FIG. 3 is a flowchart illustrating an example method to select vendors for inclusion in a vendor portfolio.

Flexible ways of selecting vendors to populate a portfolio increase the capability of vendor portfolios. FIG. 3 is a flowchart illustrating an example method of selecting vendors for 204 in FIG. 2.

At 301, there is a need to select vendors to populate a portfolio.

At 302, the user decides whether vendors will be manually selected or whether they will be selected based on a query of the vendor information within a database, such as the database 101 in FIG. 1.

At 303, if the user decides to query the vendor information, the user can decide whether the query will be run once, or whether the query will be run each time the vendor portfolio is used.

At 304, if the user decides to have the query run each time the vendor portfolio is used, the vendor portfolio is set as "dynamic" and the query is associated with the vendor portfolio. FIG. 3A is an example interface where a portfolio is dynamic, shown at 310, and the query, including possible query parameters, is shown at 309

At 305, if the user decided not to query the vendor information from 302, the user manually selects a list of vendors to populate the portfolio.

At 306, if the user decides not to query the vendor information each time the vendor portfolio is used from 303, the query is run and a list of vendors is created. This list will then be the list of vendors to populate the vendor portfolio. In various examples this act is carried out by creating a dynamic vendor portfolio and then converting it to a non-dynamic vendor portfolio.

At 307, the list created at 305 or 306 is placed within the vendor portfolio and stored in the database.

Manually selecting vendors gives users extensive control over the vendors included in vendor portfolios, increasing the user's ability to create useful portfolios for many tasks. Querying vendor information to select vendors increases the user's ability to identify vendors he wishes to manage given certain criteria. A user's ability to handle a wide variety of vendor management tasks is increased with the flexibility to choose between selecting vendors manually and selecting vendors by querying the vendor information.

Figure 4:
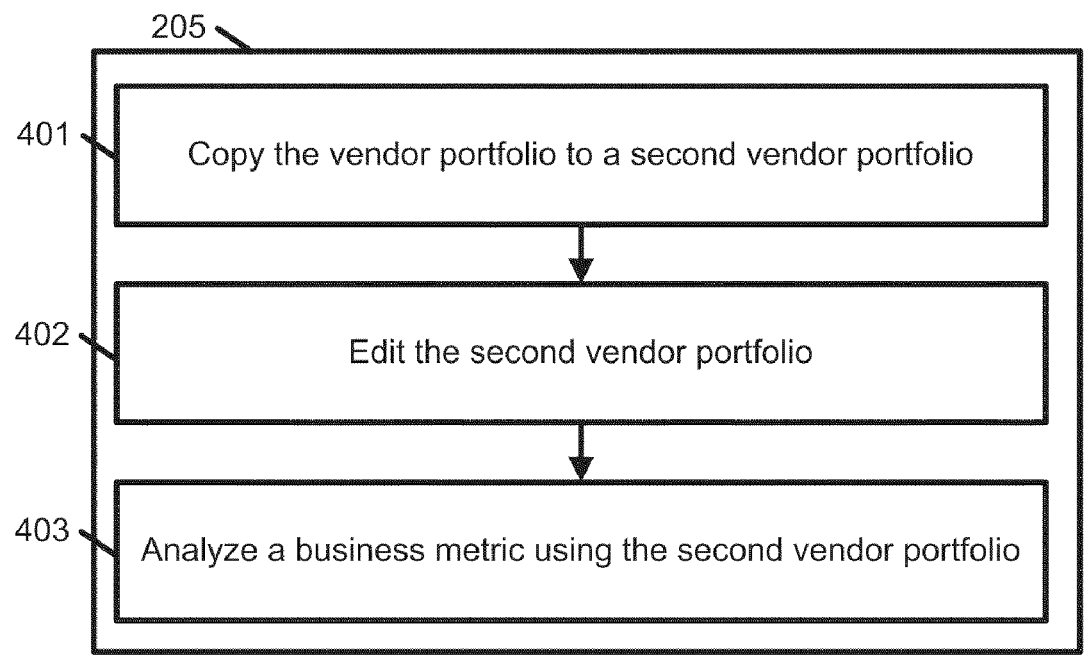
FIG. 4 is a flowchart illustrating an example method for performing what-if analysis.

FIG. 4 is a flowchart illustrating an example of a what-if analysis method to supplement the user's capabilities to manage vendors 205 in FIG. 2. What-if analysis provides several advantages for a user managing vendors because the user can manipulate vendor and vendor portfolio information and then analyze the results without impacting the organization, allowing the user to evaluate several scenarios.

At 401, the vendor portfolio the user wants to do what-if analysis on is copied to a second vendor portfolio.

At 402 the second vendor portfolio is changed. In various examples any part of the vendor portfolio can be modified, including, but not limited to, adding or removing vendors, modifying vendor information, and modifying vendor portfolio meta data. In various examples the modifications reflect the scenario the user wishes to evaluate, for example, a user analyzes a vendor portfolio of several projects and discovers that the organization is over budget, the user may then remove projects from the second vendor portfolio, simulating the cancellation of those projects.

In various examples the second vendor portfolio may be stored in a database, such as the database 101 shown in FIG. 1. Storing the second vendor portfolio, after it has been changed, allows a user to recall that second vendor portfolio at a later date, which provides useful historical context to a past decision.

At 403 a business metric is then analyzed against the second vendor portfolio. In various examples this is the evaluation of a scenario setup in 402, e.g., the example given in 402 is continued and the changed second vendor portfolio is analyzed to determine if the change meets the organizations needs from a monetary standpoint as well as from other standpoints important to the organization, such as vendor criticality.

In various examples 403 is modified to analyze a second business metric associated with an organizational risk level to support risk management of vendors. In various examples 403 is modified to analyze the organizational impact of vendor obligations.

What-if analysis greatly increases user power in managing vendors by allowing for numerous scenarios to be evaluated without impacting the organization.

Figure 5:
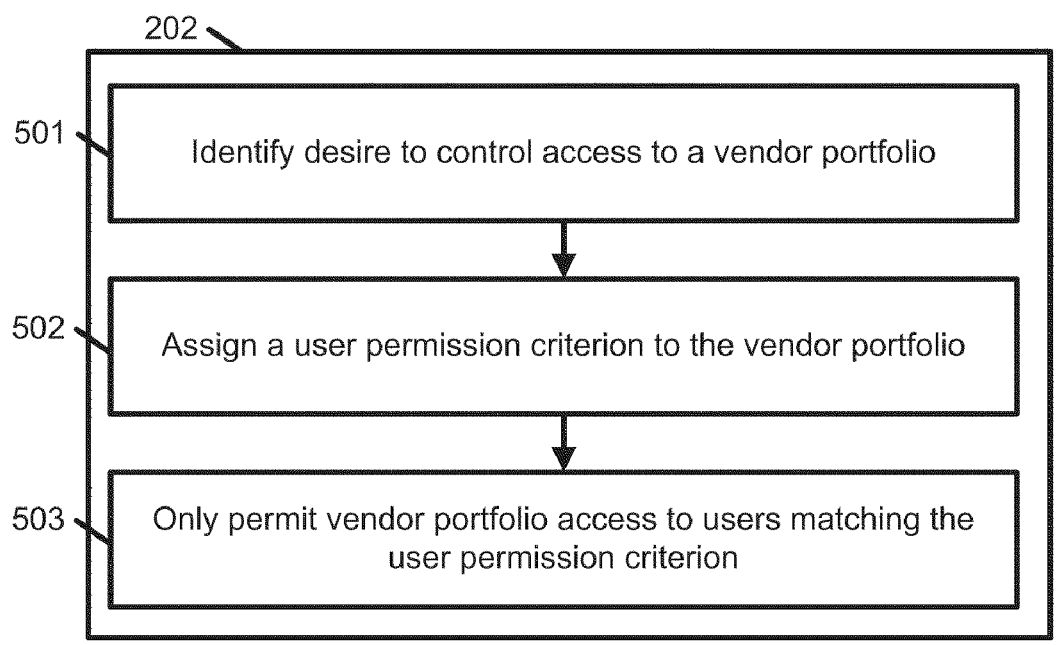
FIG. 5 is a flowchart illustrating an example method of applying user access restrictions to a vendor portfolio.

FIG. 5 is a flowchart illustrating an example method of creating user permission criterion to supplement the vendor portfolio definition 202 shown in FIG. 2. Users may want to "publish" or share vendor portfolios with other users to facilitate collaboration and increase efficiency by avoiding duplicate efforts. Providing user permission criterion to the vendor portfolio facilitates collaboration by allowing a user to control who gets access to the vendor portfolio and what other users may do to the vendor portfolio.

At 501 a user identifies a desire to control access to a vendor portfolio. In various examples the user may wish to share the vendor portfolio with a select number of other users. In various examples the user may wish to limit the ability to edit the vendor portfolio to a first set of other users and limit the ability to view the vendor portfolio to a second, non-exclusive set of other users. In various examples the user may wish other users to have some access to the vendor portfolio and that the specific limits of that access need to be controlled.

At 502 the user assigns one or more user permission criteria to the vendor portfolio. In various examples the criteria includes ownership of the vendor portfolio, view permission to the vendor portfolio, edit permission to the vendor portfolio, and delete permission to the vendor portfolio. FIG. 5A shows an example interface for setting the user permission criteria.

At 503 user access to the vendor portfolio is restricted to the user permission criterion.

The ability to control the level of access other users have to a vendor portfolio permits the user to ensure sensitive information is viewed by appropriate personal and incompetent persons will not be permitted modify the vendor portfolio. With these assurances, the user can increase organizational efficiencies by sharing the work to reduce duplicative efforts by others and the user's capability to manage vendors can be increased by involving more personnel.

Figure 6:
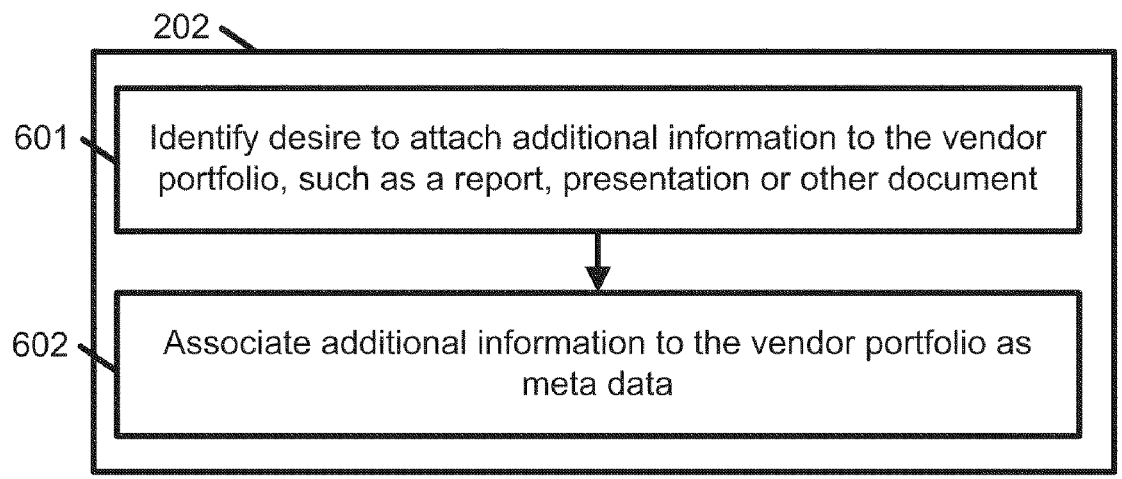
FIG. 6 is a flowchart illustrating an example method of associating meta data to a vendor portfolio.

FIG. 6 is a flowchart illustrating an example method of supplementing the vendor portfolio definition 202 shown in FIG. 2, with the ability to attach additional information to the vendor portfolio. Vendor portfolios provide the advantage of treating the collection of vendors as a unit. Storing information associated with the unit increases access to information pertinent to management decisions regarding the unit. By allowing the associated meta data to include complex pieces of information, the ability of a user to manage vendors is increased.

At 601 the user identifies the desire to attach additional information to the vendor portfolio. In various examples this information is complex and includes reports, presentations, spreadsheets, or other complex documentation. In various examples the documentation is analysis performed outside of the vendor portfolio software.

At 602 the additional information is associated with the vendor portfolio as meta data.

By having the capability to associate complex documentation with the vendor portfolio, the user no longer has to maintain such germane pieces of information in disparate locations. Collecting the information pertaining to the vendor portfolio, in the portfolio itself, is convenient for the user and ensures that the data will not be lost, increasing the user's ability to manage the vendors within the vendor portfolio.

Figure 7:
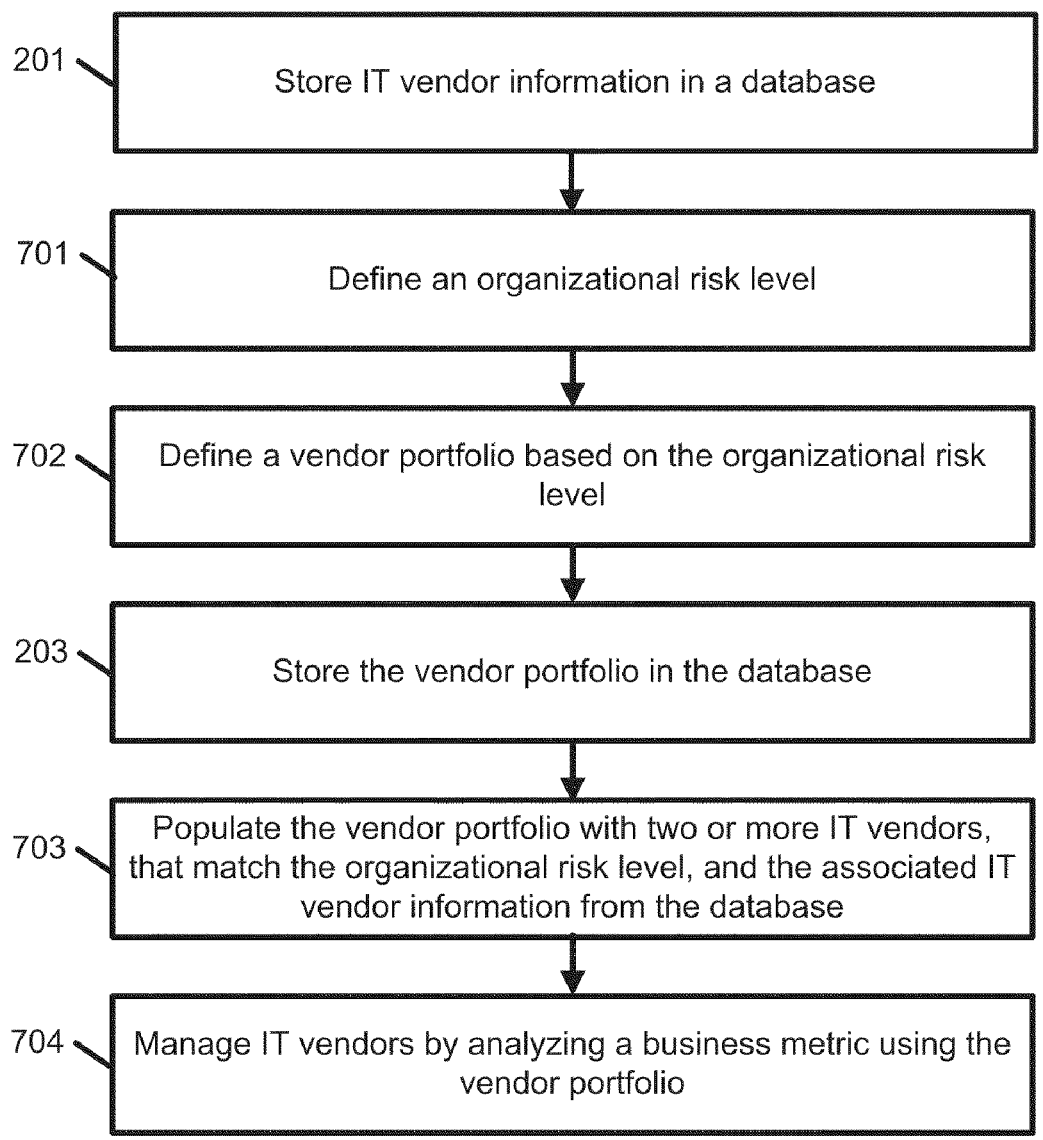
FIG. 7 is a flowchart illustrating an example IT vendor management support method using vendor portfolios based on the organizational risks posed by vendors.

FIG. 7 is a flowchart illustrating an example method for supporting vendor relationship management, analysis, planning, and evaluation while considering the organizational risk level posed by vendors. Organizations rely upon vendors to varying degrees and so the organizational risk imposed by vendors is an important consideration to those managing vendors. Determining organizational risk levels and collecting vendors that match those risk levels into vendor portfolios helps to simplify vendor management tasks and provide insight into organizational risk considerations when dealing with those vendors.

At 201 vendor information is stored in a database, such as the database 101 shown in FIG. 1. In various examples the vendor information contains metrics or labels indicating a level of risk to the organization posed by each vendor.

At 701 a user defines one or more organizational risk levels. In various examples the risk level can be determined by the vendor's access to sensitive information, whether the vendor is supporting key business processes, or whether the vendor is supporting the financial health of the organization.

At 702 a vendor portfolio is defined based on an organizational risk level defined at 701. For example, if the user defined two organizational risk levels, "high" and "medium", the vendor portfolio would be either a high risk vendor portfolio or a medium risk vendor portfolio. In various examples the vendor portfolio is defined the same way as the vendor portfolio previously discussed with respect to 202 in FIG. 2.

At 203 the vendor portfolio is stored in a database, such as the database 101 shown in FIG. 1. It will be understood that the vendor portfolio and the vendor information can be stored in the same database or different databases.

At 703 the user populates the vendor portfolio with two or more vendors that match the organizational risk level the vendor portfolio is based on. In various examples the user's selection method can follow the method shown in FIG. 3 and previously discussed. In various examples the information associated with the selected vendors is also included in the vendor portfolio.

At 704 the user uses the vendor portfolio to manage vendors in the context of the organizational risk posed by vendors. In various examples the user may analyze the vendor portfolio as previously discussed with respect to 205 in FIG. 2. In various examples the user may use a second business metric associated with the vendor portfolio's organizational risk level to analyze the vendors.

Vendor portfolios incorporating the organizational risk level provide the broad organizational risk context in which vendors are managed—increasing vendor management effectiveness. The vendor portfolio can then be used to adjust vendor use to balance the risk an organization faces from its vendors.

In various examples performing what-if analysis on a vendor portfolio that is based on an organizational risk level increases a user's ability to manage vendors. In various examples, the what-if analysis can be carried out by performing the what-if analysis shown in FIG. 4 and previously discussed. In various examples assigning one or more user permission criterion to a vendor portfolio, as shown in FIG. 5 and previously discussed, increases effective vendor management by allowing users to collaborate while controlling the various ways other users can view and manipulate a vendor portfolio.

Figure 8:
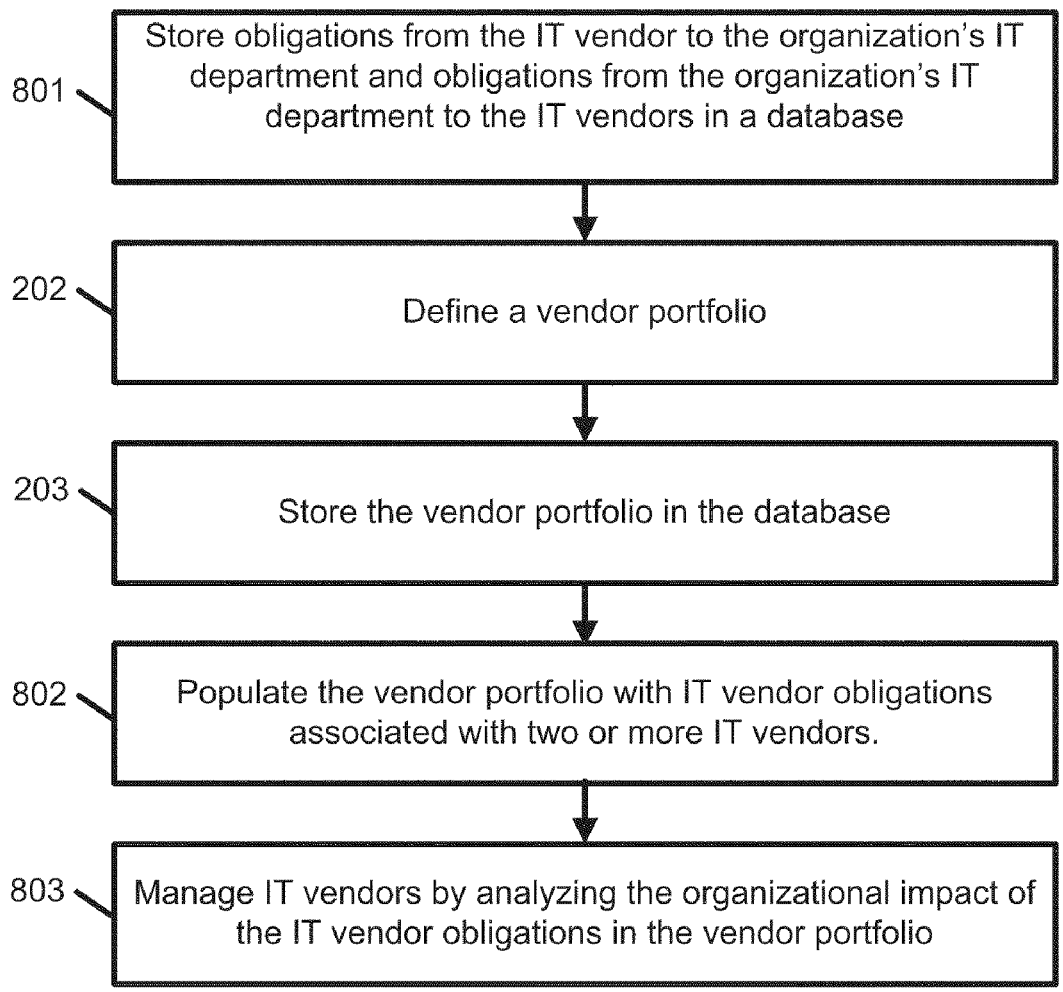
FIG. 8 is a flowchart illustrating an example IT vendor management support system using vendor portfolios to manage vendor obligations.

FIG. 8 is a flowchart illustrating an example method for supporting vendor relationship management, analysis, planning, and evaluation which modifies the method shown in FIG. 2 and previously discussed by considering vendor obligations. Organizations and vendors have obligations between each other. Managing those obligations from an organization's IT department's perspective can be simplified by creating vendor portfolios containing the obligations and capable of analyzing the organizational impact of the obligations.

At 801 obligations between the organization and vendors are stored in a database, such as the database 101 shown in FIG. 1. It will be understood that the obligations can be from the organization to a vendor, such as a required payment, or from the vendor to the organization, such as a delivery date. In various examples the obligations are specific to an organization's IT department and omit obligations not performed or owed to the IT department. In various examples other vendor information is stored in the database.

At 202 a vendor portfolio is defined the same way as the vendor portfolio previously discussed with respect to 202 in FIG. 2.

At 203 the vendor portfolio is stored in a database, such as the database 101 shown in FIG. 1. It will be understood that the vendor portfolio and the vendor information can be stored in the same database or different databases.

At 802 the user populates the vendor portfolio with obligations associated with two or more vendors. In various examples the user selects the vendors whose obligations will populate the vendor portfolio by following the method shown in FIG. 3 and previously discussed. In various examples other information associated with the selected vendors is also included in the vendor portfolio.

At 803 the user uses the vendor portfolio to analyze the organizational impact of the vendor obligations. In various examples the user may analyze the vendor portfolio as previously discussed with respect to 205 in FIG. 2. FIG. 8A shows an example interface showing vendor obligations in a vendor portfolio.

Collecting vendor obligations to IT simplifies a user's task in complying with the various obligations. Also, the obligations can be seen in the context of other vendors leading to better ways to evaluate vendors. Finally, collecting the obligations in a vendor portfolio decreases the likelihood of overlooking important obligations that can adversely impact the organization.

In various examples performing what-if analysis on a vendor portfolio analyzing the organizational impact of vendor obligations increases a user's ability to manage vendors. In various examples, the what-if analysis can be carried out by modifying the what-if analysis shown in FIG. 4, and previously discussed, to analyze the organizational impact of the vendor obligations. In various examples assigning one or more user permission criterion to the vendor portfolio, as shown in FIG. 5 and previously discussed, increases effective vendor management by allowing users to collaborate while controlling the various ways other users can view and manipulate a vendor portfolio.

In various examples vendors may belong to an unlimited number of vendor portfolios.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A computer-implemented method, the method comprising:
    storing information technology (IT) vendor information from an organization's IT vendors in a database;
    defining, by a vendor portfolio definer, a plurality of vendor portfolios and storing the plurality of vendor portfolios in the database, wherein defining the plurality of vendor portfolios includes, for each vendor portfolio, one or more of:
        defining, by a risk management definer, one or more organizational risk levels for the vendor portfolio;
        defining, by an access controller, one more user access criteria for the vendor portfolio; and
        associating, by a meta data editor, one or more meta data items with the vendor portfolio;
    populating, by a vendor portfolio populator, a first vendor portfolio with a first subset of the organization's IT vendors and associated IT vendor information;
    populating, by the vendor portfolio populator, a second vendor portfolio with a second subset of the organization's IT vendors and associated IT vendor information; and
    managing, by a vendor portfolio analyzer, the organization's IT vendors, using one or more processors, by analyzing at least one business metric across the first vendor portfolio.

2. The computer-implemented method of claim 1, wherein managing the organization's IT vendors includes performing what-if analysis, the what-if analysis including:
    copying the first vendor portfolio to a third vendor portfolio;
    changing the third vendor portfolio; and
    analyzing at least one business metric across the third vendor portfolio.

3. The computer-implemented method of claim 2, wherein changing the third vendor portfolio includes modifying, adding, or deleting at least one piece of data related to the third vendor portfolio, the one piece of data including the third vendor portfolio's definition, meta data associated with the third vendor portfolio, or the IT vendor information within the third vendor portfolio.

4. The computer-implemented method of claim 1, wherein defining the one or more user access criterion, for a given vendor portfolio, comprises assigning respective user access permissions for one or more users.

5. The computer-implemented method of claim 1, wherein associating meta data with a given vendor portfolio comprises associating at least one of a report, a presentation and a document with the given vendor portfolio.

6. A computer-implemented method, the method comprising:
    storing information technology (IT) vendor information from an organization's IT vendors in a database;

defining, by a risk management definer included in a vendor portfolio definer, at least one organizational risk level for the organization;

defining, by the vendor portfolio definer a vendor portfolio based on the organizational risk level;

storing the vendor portfolio in the database;

placing, by a vendor portfolio populator, a plurality of the organization's IT vendors that match the organizational risk level and associated IT vendor information into the vendor portfolio, wherein the vendor portfolio populator include a risk management screener configured to restrict which of the plurality of the organization's IT vendors are included in the vendor portfolio based on the organizational risk level defined by the vendor portfolio definer; and managing, by a vendor portfolio analyzer, the organization's IT vendors in the vendor portfolio, using one or more processors, by analyzing at least one business metric using the vendor portfolio.

7. The computer-implemented method of claim 6, wherein managing the organization's IT vendors includes performing what-if analysis, the what-if analysis including:

copying the vendor portfolio to a second vendor portfolio;
changing the second vendor portfolio; and
analyzing at least one business metric using the second vendor portfolio.

8. The computer-implemented method of claim 7, wherein changing the second vendor portfolio includes modifying, adding, or deleting at least one piece of data related to the second vendor portfolio, the one piece of data including the second vendor portfolio's definition, meta data associated with the second vendor portfolio, or the IT vendor information within the second vendor portfolio.

9. The computer-implemented method of claim 6, wherein defining a vendor portfolio includes managing access to the vendor portfolio by defining a user permission criterion and assigning the user permission criterion to the vendor portfolio.

10. The computer-implemented method of claim 6, wherein defining a vendor portfolio includes associating meta data with the vendor portfolio, the meta data including a report, a presentation, or a document.

11. A computer-implemented method, the method comprising:

storing information technology (IT) vendor obligations between an organization's IT department and an organization's IT vendors in a database;

defining, by a vendor portfolio definer, a vendor portfolio including a plurality of the organization's IT vendors;

storing the vendor portfolio in the database;

placing, by a vendor portfolio populator, IT vendor obligations, associated with the plurality of the organization's IT vendors, into the vendor portfolio; and managing, by a vendor portfolio analyzer, the plurality of the organization's IT vendors, using one or more processors, by analyzing, by an obligation analyzer of the vendor portfolio analyzer, the organizational impact of the IT vendor obligations within the vendor portfolio, the obligation analyzer being configured to track, for each of the plurality of vendors, obligations owed from the vendor to the organization and obligations owed from the organization to the vendor.

12. The computer-implemented method of claim 1, wherein managing the plurality of the organization's IT vendors includes performing what-if analysis, the what-if analysis including:

copying the vendor portfolio to a second vendor portfolio;

changing the second vendor portfolio; and
analyzing the organizational impact of the IT vendor obligations within the second vendor portfolio.

13. The computer-implemented method of claim 12, wherein changing the contents of the second vendor portfolio includes modifying, adding, or deleting at least one piece of data related to the second vendor portfolio, the one piece of data including the second vendor portfolio's definition, meta data associated with the second vendor portfolio, or the IT vendor obligations within the second vendor portfolio.

14. The computer-implemented method of claim 11, wherein defining a vendor portfolio includes managing access to the vendor portfolio by defining a user permission criterion and assigning the user permission criterion to the vendor portfolio.

15. The computer-implemented method of claim 11, wherein defining a vendor portfolio includes associating meta data with the vendor portfolio, the meta data including a report, a presentation, or a document.

16. A system for supporting information technology (IT) vendor management, the system comprising:

at least one processor operable to execute:
a database containing IT vendor information;
a vendor portfolio definer, coupled to the database, and configured to create a vendor portfolio and store the vendor portfolio to the database, the vendor portfolio definer including:
a risk management definer configured to define an organizational risk level for the vendor portfolio;
an access controller configured to define one more user access criteria for the vendor portfolio; and
a meta data editor configured to associate one or more meta data items with the vendor portfolio;
a vendor portfolio populator, coupled to the database, and configured to place a plurality of an organization's IT vendors and associated IT vendor information, into the vendor portfolio; and
a vendor portfolio analyzer, coupled to the database, and configured to analyze at least one business metric using the vendor portfolio.

17. The system of claim 16, wherein:
the risk management definer is further configured to associate the vendor portfolio to the organizational risk level; and
the vendor portfolio populator includes a risk management screener configured to enable only an organization's IT vendors that match the organizational risk level into the vendor portfolio.

18. The system of claim 17, wherein the vendor portfolio analyzer includes a risk management analyzer configured to analyze a second business metric, associated with the organizational risk level, using the vendor portfolio.

19. The system of claim 18, wherein the risk management analyzer includes a what-if analyzer configured to:
copy the vendor portfolio to a second vendor portfolio;
change the second vendor portfolio; and
analyze the first or second business metric using the second vendor portfolio.

20. The system of claim 16, wherein the vendor portfolio analyzer includes an obligation analyzer configured to analyze organizational impact of IT vendor obligations within the vendor portfolio, the IT vendor obligations being obligations between an organization's IT department and the organization's IT vendors.

21. The system of claim 20, wherein the obligation analyzer includes a what-if analyzer configured to:
copy the vendor portfolio to a second vendor portfolio;

change the second vendor portfolio; and
analyze the organizational impact of the IT the vendor obligations within the second vendor portfolio.

22. The system of claim 16, wherein the vendor portfolio analyzer includes a what-if analyzer configured to:
copy the vendor portfolio to a second vendor portfolio;
change the second vendor portfolio; and
analyze at least one business metric using the vendor portfolio.

23. The system of claim 16, wherein the vendor portfolio definer includes an access controller configured to define user access criteria and assigning the user access criteria to the vendor portfolio.

24. The system of claim 16, wherein the vendor portfolio definer includes a meta data editor configured to associate meta data with the vendor portfolio.

* * * * *

UNITED STATES PATENT AND TRADEMARK OFFICE
CERTIFICATE OF CORRECTION

PATENT NO. : 8,266,096 B2  
APPLICATION NO. : 12/604611  
DATED : September 11, 2012  
INVENTOR(S) : Jorge A. Navarrete et al.

Page 1 of 1

It is certified that error appears in the above-identified patent and that said Letters Patent is hereby corrected as shown below:

Title Page, Item (57), under "ABSTRACT", in column 2, line 21, delete "base" and insert -- based --, therefor.

In column 15, line 4, in claim 6, delete "definer" and insert -- definer, --, therefor.

In column 15, line 63, in claim 12, delete "claim 1," and insert -- claim 11, --, therefor.

In column 17, line 2, in claim 21, after "IT" delete "the".

Signed and Sealed this  
Sixth Day of November, 2012

David J. Kappos  
*Director of the United States Patent and Trademark Office*